United States Patent
Chikkala et al.

(10) Patent No.: US 12,008,605 B2
(45) Date of Patent: Jun. 11, 2024

(54) PEER-TO-PEER DONATION MANAGEMENT

(71) Applicant: INTERNATIONAL BUSINESS MACHINES CORPORATION, Armonk, NY (US)

(72) Inventors: Ravithej Chikkala, Pflugerville, TX (US); Hamid Majdabadi, Ottawa (CA); Manjunath Ravi, Austin, TX (US); Su Liu, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 250 days.

(21) Appl. No.: 17/651,295

(22) Filed: Feb. 16, 2022

(65) Prior Publication Data
US 2023/0259987 A1    Aug. 17, 2023

(51) Int. Cl.
*G06Q 30/0279* (2023.01)
*G06Q 20/06* (2012.01)
*G06Q 20/22* (2012.01)
*G06Q 20/40* (2012.01)

(52) U.S. Cl.
CPC ....... *G06Q 30/0279* (2013.01); *G06Q 20/065* (2013.01); *G06Q 20/223* (2013.01); *G06Q 20/4014* (2013.01)

(58) Field of Classification Search
None
See application file for complete search history.

(56) References Cited

U.S. PATENT DOCUMENTS

| | | |
|---|---|---|
| 9,614,840 B2 | 4/2017 | Tsou |
| 10,043,184 B2 | 8/2018 | Agarwal |
| 2014/0046866 A1 | 2/2014 | Worth |

(Continued)

FOREIGN PATENT DOCUMENTS

EP    3295347 A1    3/2018

OTHER PUBLICATIONS

Farnsworth, "Eye Tracking: The Complete Pocket Guide", Dec. 4, 2018, Blog, Imotions, 50 pages.

(Continued)

*Primary Examiner* — Jan P Mincarelli
(74) *Attorney, Agent, or Firm* — Robert R. Aragona (57) ABSTRACT

An embodiment for managing peer-to-peer (P2P) donations in an online transaction is provided. The embodiment may include receiving data relating to a donation agreement from a donor. The embodiment may also include selecting one or more authentication techniques to identify a donee. The embodiment may further include generating a unique redemption authentication token for the donee. The embodiment may also include creating a transient donee account including the generated unique redemption authentication token. The embodiment may further include transferring monetary funds to the created transient donee account with instructions to redeem the transferred monetary funds. The embodiment may also include receiving a request from the donee to redeem the transferred monetary funds utilizing the generated unique redemption authentication token. The embodiment may further include in response to determining the donee is able to be verified, approving the received redemption request.

20 Claims, 6 Drawing Sheets

(56) References Cited

U.S. PATENT DOCUMENTS

| | | | |
|---|---|---|---|
| 2016/0140567 A1* | 5/2016 | Hanna | G06Q 20/4016 |
| | | | 705/44 |
| 2016/0335512 A1 | 11/2016 | Bradski | |
| 2018/0005244 A1* | 1/2018 | Govindarajan | G06Q 20/40 |
| 2021/0264008 A1 | 8/2021 | Kurylko | |
| 2022/0156803 A1* | 5/2022 | Sylvester | G06Q 40/10 |

OTHER PUBLICATIONS

Findlay et al., "Human saccadic eye movements", 2012, Scholarpedia, 7 (7):5095, Aug. 1, 2012, 9 pages.

Makowski et al., "A Discriminative Model for Identifying Readers and Assessing Text Comprehension from Eye Movements", Cornell University, Sep. 2018, 19 pages. https://arxiv.org/pdf/1809.08031.pdf.

Mell et al., "The NIST Definition of Cloud Computing", Recommendations of the National Institute of Standards and Technology, NIST Special Publication 800-145, Sep. 2011, 7 pages.

Owoseje, "Homeless People Are Wearing Barcodes to Encourage More Cashless Donations", Independent, Aug. 10, 2018, 7 pages. https://www.independent.co.uk/life-style/gadgets-and-tech/homeless-barcodes-cashless-payments-donations-a8485956.html.

Wiggers, "AI Researchers Can Now Identify People by Eye Movements", VentureBeat, Sep. 24, 2018, 6 Pages. https://venturebeat.com/2018/09/24/ai-researchers-can-now-identify-people-by-eye-movements/.

Wikipedia, "Fisher kernel", Aug. 29, 2021, 3 pages.

* cited by examiner

PEER-TO-PEER DONATION MANAGEMENT

BACKGROUND

The present invention relates generally to the field of computing, and more particularly to a system for managing peer-to-peer (P2P) donations in an online transaction.

Modern devices have touch display screens and/or keyboards where a user is able to interact with icons and letters on the display screens and/or keyboards with the touch of a finger. Such devices include, but are not limited to, mobile phones, smartwatches, tablets, desktop computers, as well as laptop computers. These devices may include "smart" devices having the capability of connecting to the internet and performing a wide variety of functions. These functions may include the transfer of files, images, text, voice, and/or money. In the United States, billions of dollars are transferred online each year. One example of such online transfers include transfers in the form of monetary donations. For example, a donor may wish to send money in real-time to an individual (i.e., a donee).

SUMMARY

According to one embodiment, a method, computer system, and computer program product for managing peer-to-peer (P2P) donations in an online transaction is provided. The embodiment may include receiving data relating to a donation agreement from a donor. The embodiment may also include selecting one or more authentication techniques to identify a donee based on the data relating to the donation agreement. The embodiment may further include generating a unique redemption authentication token for the donee in response to executing the one or more selected authentication techniques. The embodiment may also include creating a transient donee account. The created transient donee account may include the generated unique redemption authentication token. The embodiment may further include transferring monetary funds to the created transient donee account with instructions to redeem the transferred monetary funds. The embodiment may also include receiving a request from the donee to redeem the transferred monetary funds utilizing the generated unique redemption authentication token based on the instructions.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to a system for managing peer-to-peer (P2P) donations in an online transaction. The following described exemplary embodiments provide a system, method, and program product to, among other things, generate a unique redemption authentication token for a donee in response to executing a selected authentication technique and, accordingly, verify an identity of the donee upon receiving a request from the donee to redeem transferred funds. Therefore, the present embodiment has the capacity to improve online payment technology by dynamically integrating with personal financial applications, thus securing and simplifying online payments such as online donations.

As previously described, modern devices have touch display screens and/or keyboards where a user is able to interact with icons and letters on the display screens and/or keyboards with the touch of a finger. Such devices include, but are not limited to, mobile phones, smartwatches, tablets, desktop computers, as well as laptop computers. These devices may include "smart" devices having the capability of connecting to the internet and performing a wide variety of functions. These functions may include the transfer of files, images, text, voice, and/or money. In the United States, billions of dollars are transferred online each year. One example of such online transfers include transfers in the form of monetary donations. For example, a donor may wish to send money in real-time to an individual (i.e., a donee). When making an online transfer of money to the donee, the donor may wish to track and manage the donation to ensure the intended donee actually receives the money. Often, donors do not know who actually received the donation. This problem is typically addressed by generating a barcode for the donee in response to the donee registering a donation account so that others (i.e., donors) can scan the barcode using a device of the donor. However, donees may lack the resources to open an account and may not even be aware such accounts exist. It may therefore be imperative to have a system in place to dynamically integrate with personal financial applications used by both donors and participating businesses to secure and simplify online payments such as online donations. Thus, embodiments of the present invention may provide advantages including, but not limited to, dynamically integrating with personal financial applications used by both donors and participating businesses to secure and simplify online payments such as online donations, enabling an online transfer of money to donees who may lack the resources to obtain such online payments, and providing donees with recommendations of participating business where they can redeem money transferred online. The present invention does not require that all advantages need to be incorporated into every embodiment of the invention.

According to at least one embodiment, when a donor is making a cashless donation, data relating to a donation agreement may be received from a donor in order to select one or more authentication techniques to identify a donee based on the data relating to the donation agreement. Upon selecting the one or more authentication techniques, a unique redemption authentication token may be generated for the donee in response to executing the one or more selected authentication techniques so that a transient donee account including the generated unique redemption authentication token may be created. Upon creating the transient donee account, monetary funds may be transferred to the created transient donee account with instructions to redeem the transferred monetary funds such that a request from the donee to redeem the transferred monetary funds may be received utilizing the generated unique redemption authentication token based on the instructions. According to at least one embodiment, in response to determining the donee is able to be verified, the received redemption request may be approved and the donee may retrieve an item. According to at least one other embodiment, in response to determining the donee is not able to be verified, the received redemption request may be denied and the donee may not retrieve the item.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to generate a unique redemption authentication token for a donee in response to executing a selected authentication technique and, accordingly, verify an identity of the donee upon receiving a request from the donee to redeem transferred funds.

Figure 1:
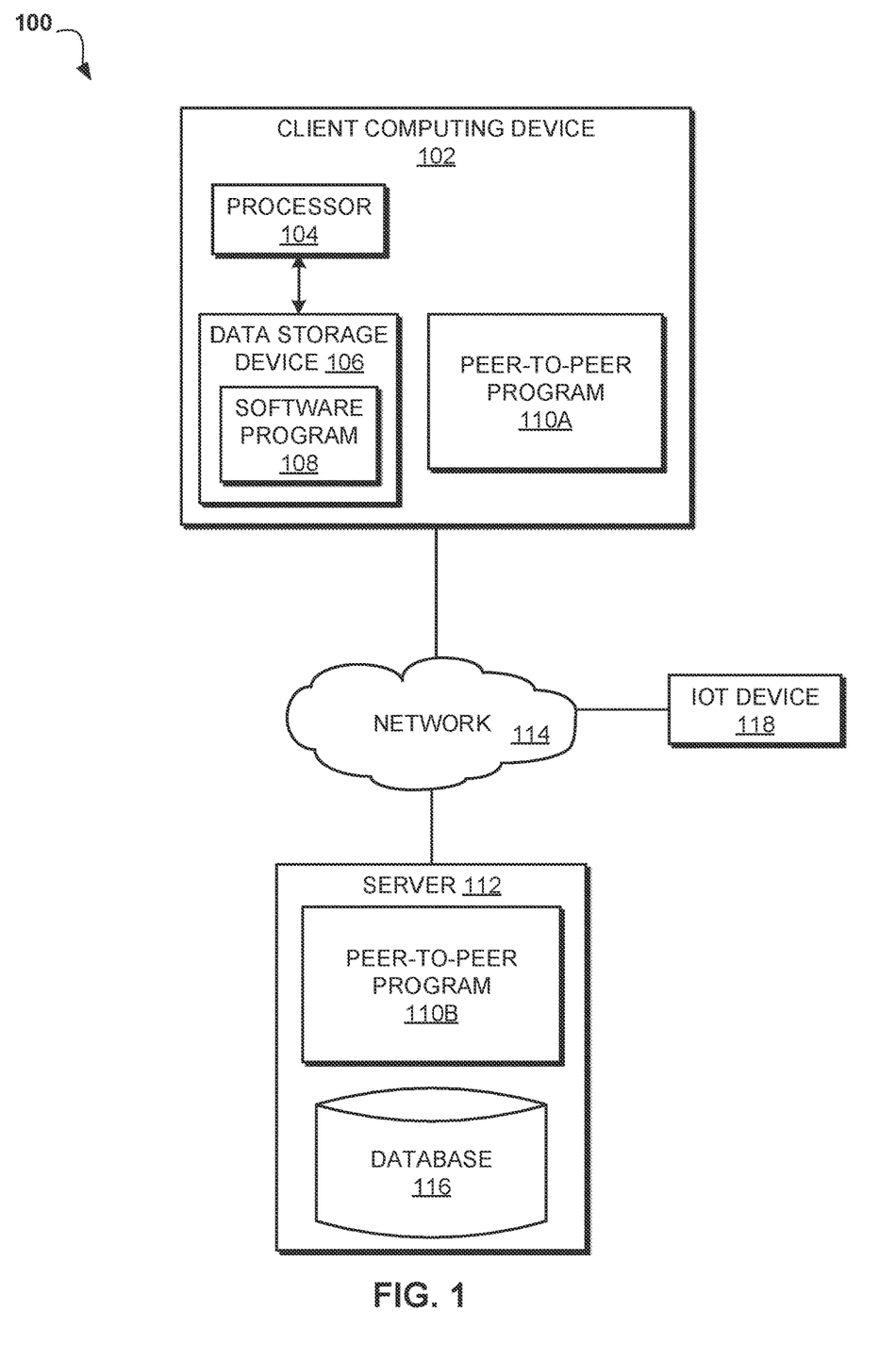
FIG. 1 illustrates an exemplary networked computer environment according to at least one embodiment.

Referring to FIG. 1, an exemplary networked computer environment 100 is depicted, according to at least one embodiment. The networked computer environment 100 may include client computing device 102, a server 112, and Internet of Things (IoT) Device 118 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a P2P program 110A and communicate with the server 112 and IoT Device 118 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 4, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running a P2P program 110B and a database 116 and communicating with the client computing device 102 and IoT Device 118 via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

IoT Device 118 may be a mobile device, such as a smartphone, smartwatch, tablet, and/or any other IoT Device 118 known in the art for detecting eye movements or otherwise authenticating a user that is capable of connecting to the communication network 114, and transmitting and receiving data with the client computing device 102 and the server 112.

According to the present embodiment, the P2P program 110A, 110B may be a program capable of receiving data relating to a donation agreement from a donor, generating a unique redemption authentication token for a donee in response to executing a selected authentication technique, verifying an identity of the donee upon receiving a request from the donee to redeem transferred funds, dynamically integrating with personal financial applications used by both donors and participating businesses to secure and simplify online payments such as online donations, enabling an online transfer of money to donees who may lack the resources to obtain such online payments, and providing donees with recommendations of participating business where they can redeem money transferred online. The P2P donation management method is explained in further detail below with respect to FIG. 2.

Figure 2:
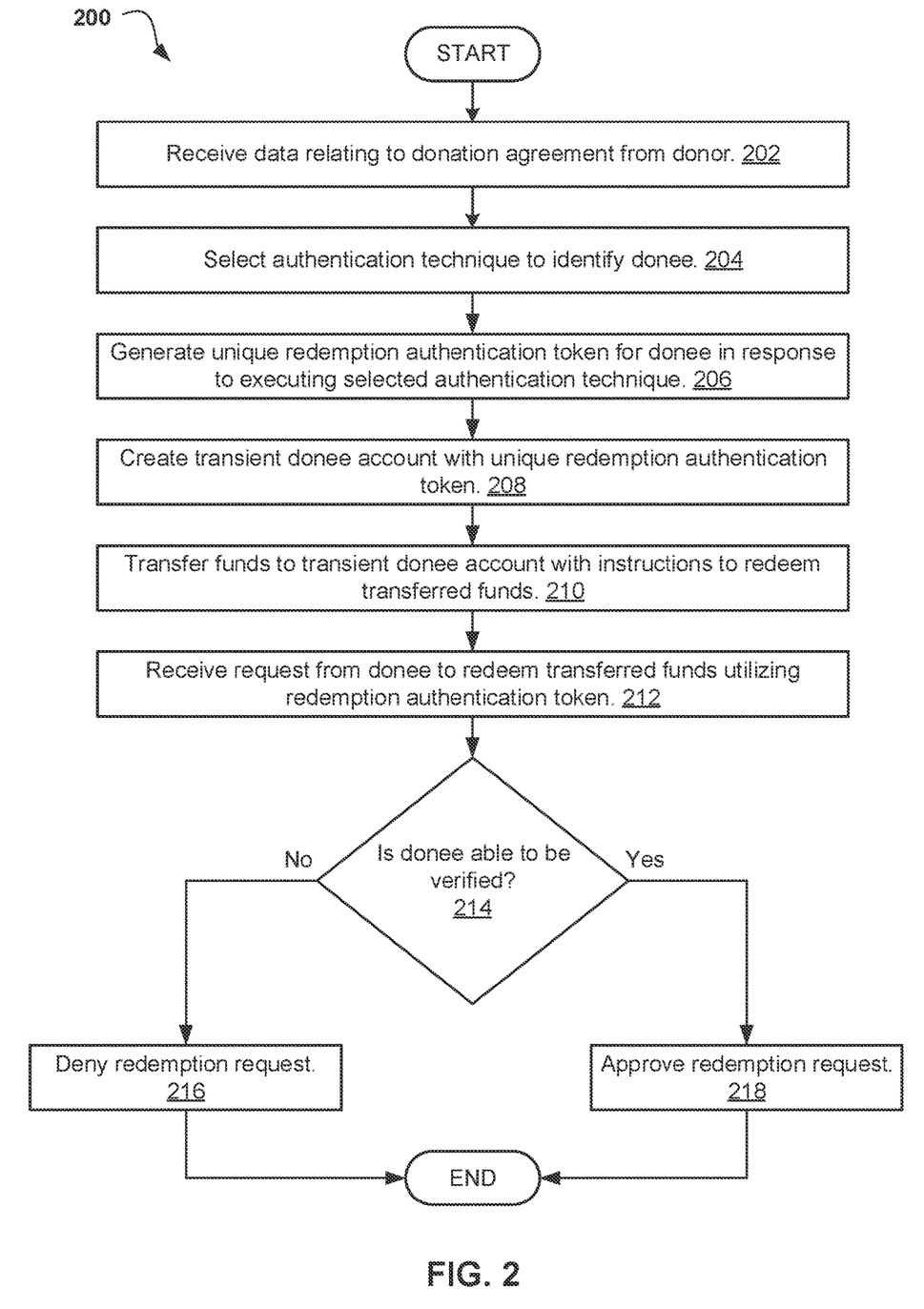
FIG. 2 illustrates an operational flowchart for managing peer-to-peer (P2P) donations in an online transaction in a P2P donation management process according to at least one embodiment.

Referring now to FIG. 2, an operational flowchart for managing P2P donations in an online transaction in a P2P donation management process 200 is depicted according to at least one embodiment. At 202, the P2P program 110A, 110B receives the data relating to the donation agreement from the donor. The donor may be an individual who is making a monetary donation to a donee, who may be an individual in need of financial assistance. According to at least one embodiment, some of the data relating to the donation agreement may be input by the donor via a graphical user interface (GUI) on a device of the donor, which may be received by the P2P program 110A, 110B. This data may include, but is not limited to, a name of the donor, a name of the donee, an item to be redeemed by the donee (e.g., food or clothing), and a donation amount (e.g., $25). Other data relating to the donation agreement may be captured automatically by the P2P program 110A, 110B. This data may include, but is not limited to, a time of the donation, a location of the donation, and participating businesses where the donation may be redeemed (i.e., a redeem store network). The data relating to the donation agreement may be stored in a table in a database, such as a peer-to-peer donation management (P2PDM) database described in further detail below with respect to FIG. 3. The table is described in further detail below with respect to step 208.

Then, at 204, the P2P program 110A, 110B selects the one or more authentication techniques to identify the donee. The one or more authentication techniques are selected based on the data relating to the donation agreement described above with respect to step 202. For example, the amount of money donated may be the driving factor in selecting the one or more authentication techniques. Continuing the example, a donation of $10 or less may require a passcode given to the donee, whereas a donation of $50 may require a more secure authentication technique, such as an eye movement pattern of the donee and/or biometrics of the donee. In another example, the item to be redeemed may be the driving factor in selecting the one or more authentication techniques. Continuing the example, a food item may require a passcode given to the donee, whereas a clothing item may require a more secure authentication technique, such as an eye movement pattern of the donee and/or biometrics of the donee. It may be appreciated that the examples described above are not intended to be limiting, and that in embodiments of the present invention the one or more authentication techniques may be selected according to different monetary thresholds and/or different factors.

According to at least one embodiment, the selected authentication technique may be an eye movement pattern of the donee. Recent data has shown human eyes wander as individuals read text or view images. These movements may be driven by cognitive processes involving vision, attention, language, and motor control, and may be used to accurately identify an individual. In this embodiment, the P2P program 110A, 110B may automatically select a viewing material to be displayed to the donee on the device of the donor, described in further detail below with respect to step 206. The viewing material may either be an image, such as a picture, or text. For example, the viewing material to be displayed to the donee may be an image or text from a website. In another example, the viewing material to be displayed to the donee may be a randomly generated image or text.

According to at least one other embodiment, the selected authentication technique may be biometrics of the donee. Biometrics may include a fingerprint of the donee or a voice of the donee. In this embodiment, the P2P program 110A, 110B may capture a fingerprint of the donee, or record a voice of the donee, described in further detail below with respect to step 206.

According to at least one further embodiment, the selected authentication technique may be a passcode given to the donee. In this embodiment, the P2P program 110A, 110B may automatically generate an alphanumeric passcode to be given to the donee or the donee may select a passcode of their choice, described in further detail below with respect to step 206. For example, the passcode selected by the donee may be a word or phrase that the donee can easily memorize.

Next, at 206, the P2P program 110A, 110B generates the unique redemption authentication token for the donee. The unique redemption authentication token is generated in response to executing the one or more selected authentication techniques described above with respect to step 204. The unique redemption authentication token may be an electronic key that enables a user (e.g., the donee) to authenticate their identity by storing certain information about the user. In the embodiments described below, multiple authentication techniques may be executed, or one authentication technique may be executed. For example, the eye movement pattern of the donee and the biometrics of the donee may be used together as authentication techniques.

According to at least one embodiment, as described above with respect to step 204, the selected authentication technique may be an eye movement pattern of the donee. The P2P program 110A, 110B may automatically select the viewing material to be displayed to the donee on the device of the donor. When the viewing material is displayed to the donee (i.e., executing the selected authentication technique), the P2P program 110A, 110B may track the eye movement pattern of the donee while the donee is looking at the viewing material, and may generate an ID for the tracked eye movement pattern, which may be the unique redemption authentication token. The unique redemption authentication token may be stored in the table, described in further detail below with respect to step 208.

According to at least one other embodiment, as described above with respect to step 204, the selected authentication technique may be biometrics of the donee. The P2P program 110A, 110B may display a fingerprint icon on the device of the donor. When the fingerprint icon is displayed to the donee, the donee may place a finger on the fingerprint icon so that the P2P program 110A, 110B may capture the fingerprint of the donee and may generate an ID for the captured fingerprint, which may be the unique redemption authentication token. Alternatively, the P2P program 110A, 110B may display a recording icon on the device of the donor. When the recording icon is displayed to the donee, the donee may tap on the icon and begin speaking so that the P2P program 110A, 110B may record the voice of the donee and may generate an ID for the recorded voice, which may be the unique redemption authentication token. The unique redemption authentication token may be stored in the table, described in further detail below with respect to step 208.

According to at least one further embodiment, as described above with respect to step 204, the selected authentication technique may be a passcode given to the donee. The P2P program 110A, 110B may automatically generate an alphanumeric passcode to be given to the donee and may display the alphanumeric passcode to the donee on the device of the donor and may generate an ID for the alphanumeric passcode, which may be the unique redemption authentication token. Alternatively, the P2P program 110A, 110B may prompt the donee to select a passcode of their choice via the GUI of the device of the user. When the donee is prompted to enter the passcode, the donee may enter the passcode so that the P2P program 110A, 110B may record the passcode and may generate an ID for the donee-selected passcode, which may be the unique redemption authentication token. The unique redemption authentication token may be stored in the table, described in further detail below with respect to step 208.

Then, at 208, the P2P program 110A, 110B creates the transient donee account. The created transient donee account includes the generated unique redemption authentication token. The transient donee account may be created in any participating e-payment application. The e-payment application may be linked to a bank account of the donor. The donee account is transient in that the account of the donee may be deleted after the redemption request is approved, described in further detail below with respect to step 218, or after a pre-defined period of time (e.g., 24 hours). According to at least one embodiment, the data relating to the donation agreement and the unique redemption authentication token may be stored in the table, which may be associated with the transient donee account.

According to at least one other embodiment, where at least one of the one or more selected authentication techniques is the eye movement pattern of the donee, the data relating to the donation agreement, an ID of the viewing material, and the unique redemption authentication token may be stored in the table. The structure of the table may be as follows:

| Time/ Location | Donor ID | Donation Amount | Donee ID | Viewing Material ID | Authentication Token | Donation Context | Redeem Network |
|---|---|---|---|---|---|---|---|
| 12 p.m. 23 Main St. | D0001 | $30 | R001 | VM 8901 | EM 0005 | Clothing | Business 0001 |
| 1 p.m. 125 Broadway | D0002 | $25 | R0001 | N/A | FP 0005 | Food | Business 0002 |
| 2 p.m. 15 Elm St. | D0003 | $10 | R0001 | N/A | P 0005 | Food | Business 0002 |
| 3 p.m. 4 Broad St. | D0004 | $15 | R0001 | N/A | V 0005 | Food | Business 0002 |

In the table above, "Viewing Material ID" is in bold to specify this information is only included in embodiments where at least one selected authentication technique is the eye movement pattern of the donee and is denoted by "VM" followed by a number for the specific viewing material. For example, VM 8901 may be a specific image or a specific line of text. The name of the donor and the name of the donee may be translated into a numeric ID for privacy purposes, where "D" denotes the donor and "R" denotes the donee. As described above with respect to step 206, an ID may be generated for the unique redemption authentication token. "EM" denotes eye movement pattern of the donee, "FP" denotes fingerprint of the donee, "P" denotes passcode given to the donee, and "V" denotes voice of the donee. The unique redemption authentication token may be used to verify the donee, described in further detail below with respect to step 214.

Continuing reference to the table above, four different donors (i.e., D0001-D0004) make donations to the same donee (i.e., R0001). In embodiments of the present invention, it may be appreciated that one donor or multiple donors may make a donation to the same donee. Depending on the "Donation Context," the donee may go to a nearby business (e.g., Business 0002) to redeem the item. The nearby business may be a business within walking distance (e.g., one mile) of the location of the donation.

Next, at 210, the P2P program 110A, 110B transfers the monetary funds to the created transient donee account with instructions to redeem the transferred monetary funds. As described above with respect to step 208, the transient donee account may be created in any participating e-payment application, which may be linked to a bank account of the donor. For example, the donor may transfer $30 to the created transient donee account in accordance with the donation agreement described above with respect to step 202.

Once the monetary funds have been transferred to the created transient donee account, the donee may be provided with instructions on how to redeem the transferred monetary funds. According to at least one embodiment, the instructions may include audio instructions played for the donee on the device of the donor. The audio instructions may include where and when the transferred monetary funds are to be redeemed. For example, the audio instructions may be, "Please go to Business 0002 at the intersection of Broadway and 125$^{th}$ Street to redeem a food item of $30 or less by 11:00 p.m. on March 23$^{rd}$." Continuing the example, Business 0002 may be within walking distance of the location of the donation (e.g., 125 Broadway). It may be appreciated that in embodiments of the present invention, the donor may make a cashless on-street donation to the donee, who may or may not have a device of their own. In this manner, the donor may dynamically make a real-time donation to any individual requiring assistance (i.e., the donee).

Then, at 212, the P2P program 110A, 110B receives the request from the donee to redeem the transferred monetary funds utilizing the generated unique redemption authentication token. The request is received based on the instructions described above with respect to step 210. As described above with respect to step 210, the donee may receive audio instructions detailing where and when the donee should redeem the transferred monetary funds. For example, referring to the table above, when the donor donates $30 to the donee and indicates in the donation agreement that the $30 is to be spent on a clothing item, the P2P program 110A, 110B may search for the closest store in the redeem store network to 23 Main Street (i.e., Business 0001) and recommend this store via the audio instructions. Continuing the example, the donee may go to the recommended store in accordance with the audio instructions and request to obtain the clothing item, which may be interpreted by the P2P program 110A, 110B as the request to redeem the transferred monetary funds. In order to redeem the transferred monetary funds, and thus obtain the item, the donee may be verified based on the generated unique redemption authentication token, described in further detail below with respect to step 214.

According to at least one embodiment, when the received redemption request from the donee is made after a predefined redemption deadline, the transferred monetary funds may revert back to the donor (e.g., to a bank account of the donor). For example, when the audio instructions are, "Please go to Business 0002 at the intersection of Broadway and 125$^{th}$ Street to redeem a food item of $30 or less by 11:00 p.m. on March 23$^{rd}$," if the redemption request from the donee is not received by 11:00 p.m. on March 23$^{rd}$, the transferred monetary funds may revert back to the donor. In this manner, the donor may be made aware that the donee has not redeemed the transferred monetary funds and may choose to make a subsequent donation to the same donee if desired.

Next, at 214, the P2P program 110A, 110B determines whether the donee is able to be verified. The determination is made based on the generated unique redemption authentication token described above with respect to steps 206 and 208. The donee may be verified by executing the same authentication technique that was executed in step 206 above to generate the unique redemption authentication token.

According to at least one embodiment, where the selected authentication technique is the eye movement pattern of the donee, the donee may be verified, on a device of the business, by displaying the same viewing material the P2P program 110A, 110B used to track the eye movement pattern of the donee in step 206 above. For example, referring to the table above, where the viewing material ID displayed to the donee in step 206 above is "VM 8901," the same viewing material (i.e., "VM 8901") may be displayed to the donee in step 214. The ID for the tracked eye movement pattern generated in step 206, which may be the unique redemption authentication token, and stored in the table above may be compared with an ID for the tracked eye movement pattern generated in step 214. If the IDs match, the donee is verified. For example, referring to the table above, the unique redemption authentication token in the table (i.e., "EM 0005") may be compared with the ID for the tracked eye movement pattern generated in step 214. Continuing the example, if the ID for the tracked eye movement pattern generated in step 214 is "EM 0005," the IDs match and the donee is verified. If the ID for the tracked eye movement pattern generated in step 214 is "EM 0004," the IDs do not match and the donee is not verified.

According to at least one other embodiment, where the selected authentication technique is the biometrics of the donee, the donee may be verified, on the device of the business, by displaying the same fingerprint icon the P2P program 110A, 110B used to capture the fingerprint of the donee in step 206 above. The ID for the captured fingerprint generated in step 206, which may be the unique redemption authentication token, and stored in the table above may be compared with an ID for the captured fingerprint generated in step 214. If the IDs match, the donee is verified. For example, referring to the table above, the unique redemption authentication token in the table (i.e., "FP 0005) may be compared with the ID for the captured fingerprint generated in step 214. Continuing the example, if the ID for the captured fingerprint generated in step 214 is "FP 0005," the IDs match and the donee is verified. If the ID for the captured fingerprint generated in step 214 is "FP 0004," the IDs do not match and the donee is not verified. Alternatively, the ID for the recorded voice generated in step 206, which may be the unique redemption authentication token, and stored in the table above may be compared with an ID for the recorded voice generated in step 214 by displaying the same recording icon the P2P program 110A, 110B used to record the voice of the donee in step 206 above. If the IDs match the donee is verified. If the IDs do not match, the donee is not verified.

According to at least one further embodiment, where the selected authentication technique is the passcode given to the donee, the donee may be verified, on the device of the business, by prompting the donee to enter the same passcode the P2P program 110A, 110B generated and displayed to the donee in step 206 above. The ID for the passcode given to the donee generated in step 206, which may be the unique redemption authentication token, and stored in the table above may be compared with an ID for the passcode generated in step 214. If the IDs match, the donee is verified. For example, referring to the table above, the unique redemption authentication token in the table (i.e., "P 0005") may be compared with the ID for the passcode generated in step 214. Continuing the example, if the ID for the passcode generated in step 214 is "P 0005," the IDs match and the donee is verified. If the ID for the passcode generated in step 214 is "P 0004," the IDs do not match and the donee is not verified.

In response to determining the donee is not able to be verified (step 214, "No" branch), the P2P donation management process 200 proceeds to step 216 to deny the received redemption request. In response to determining the donee is able to be verified (step 214, "Yes" branch), the P2P donation management process 200 proceeds to step 218 to approve the received redemption request.

Then, at 216, the P2P program 110A, 110B denies the received redemption request. As described above with respect to step 214, where the IDs do not match, the donee is not able to be verified and the donee may not redeem the transferred monetary funds. A potential reason for the IDs not matching may be that the individual attempting to redeem the donation is not the same individual to whom the donation was made. Thus, embodiments of the present invention may assist in the prevention of identity theft.

Next, at 218, the P2P program 110A, 110B approves the received redemption request. As described above with respect to step 214, where the IDs match, the donee is able to be verified and the donee may redeem the transferred monetary funds. For example, the donee may be able to obtain the item specified in the donation agreement. According to at least one embodiment, the created transient donee account may be deleted after approving the received redemption request. In this manner, personal information associated with the donee may not be stored, thus preserving the right to privacy of the donee.

Figure 3:
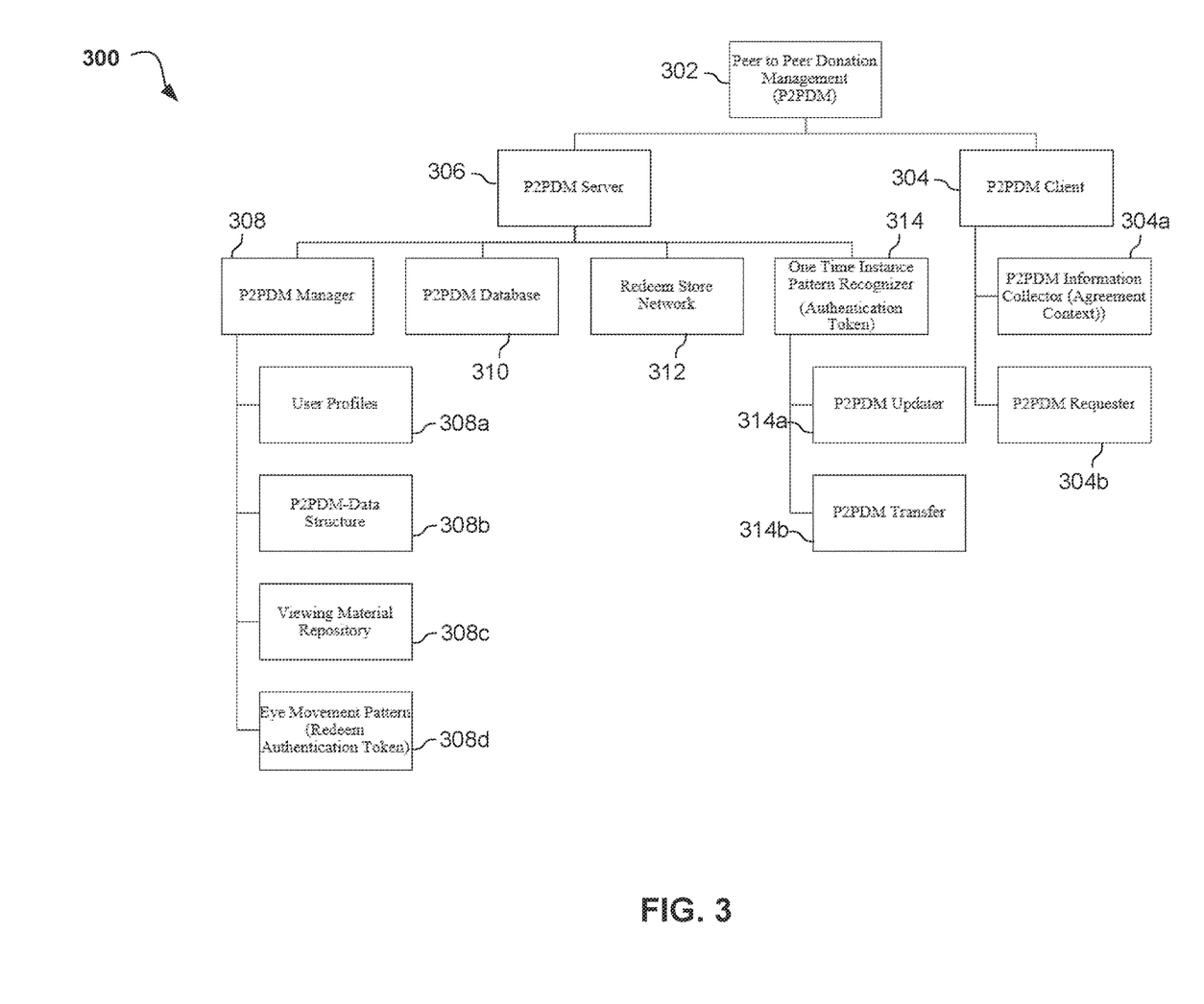
FIG. 3 is a diagram depicting an interaction between solution components of the process in FIG. 2 according to at least one embodiment.

Referring now to FIG. 3, a diagram 300 depicting an interaction between solution components of the process in FIG. 2 is shown according to at least one embodiment. In the diagram 300, a peer-to-peer donation management (P2PDM) hierarchy 302 is depicted.

A P2PDM client component 304 may include a P2PDM information collector module 304*a* and a P2PDM requestor module 304*b*. The P2PDM information collector module 304*a* may be used to collect the data relating to the donation agreement in response to a request by the donor to make a donation submitted by the P2PDM requestor module 304*b*.

A P2PDM server component 306 may include a P2PDM manager component 308 which may be used to create and manage the transient donee account. The P2PDM manager component 308 may include a profile of the donor and a profile of the donee, collectively user profiles 308*a*, a P2PDM data structure 308*b*, which may be the table described above with respect to FIG. 2, a viewing material repository 308*c*, from which the viewing material displayed to the donee may be selected, and an eye movement pattern module 308*d*, which may recognize the eye movement pattern of the donee, on the device of the business, and generate an ID for the eye movement pattern to compare with the ID stored in the table described above with respect to FIG. 2.

The P2PDM server component 306 may also include a P2PDM database 310, which may store the data relating to the donation agreement as well as the table described above with respect to FIG. 2, a redeem store network component 312, which may contain a list of participating businesses where the transferred monetary funds may be redeemed, and a one time instance pattern recognizer component 314. The one time instance pattern recognizer component 314 may select the authentication technique and generate the unique redemption authentication token, which may be stored in the table described above with respect to FIG. 2, upon executing the selected authentication technique on the device of the donor. The one time instance pattern recognizer component 314 may also include a P2PDM updater module 314*a*, which may update the created transient donee account when multiple donations are made to the same donee, either by the same donor or different donors, and may include a P2PDM transfer module 314b, which may transfer the monetary funds from the bank account of the donor to the created transient donee account.

It may be appreciated that FIGS. 2 and 3 provide only an illustration of one implementation and do not imply any limitations with regard to how different embodiments may be implemented. Many modifications to the depicted environments may be made based on design and implementation requirements.

Figure 4:
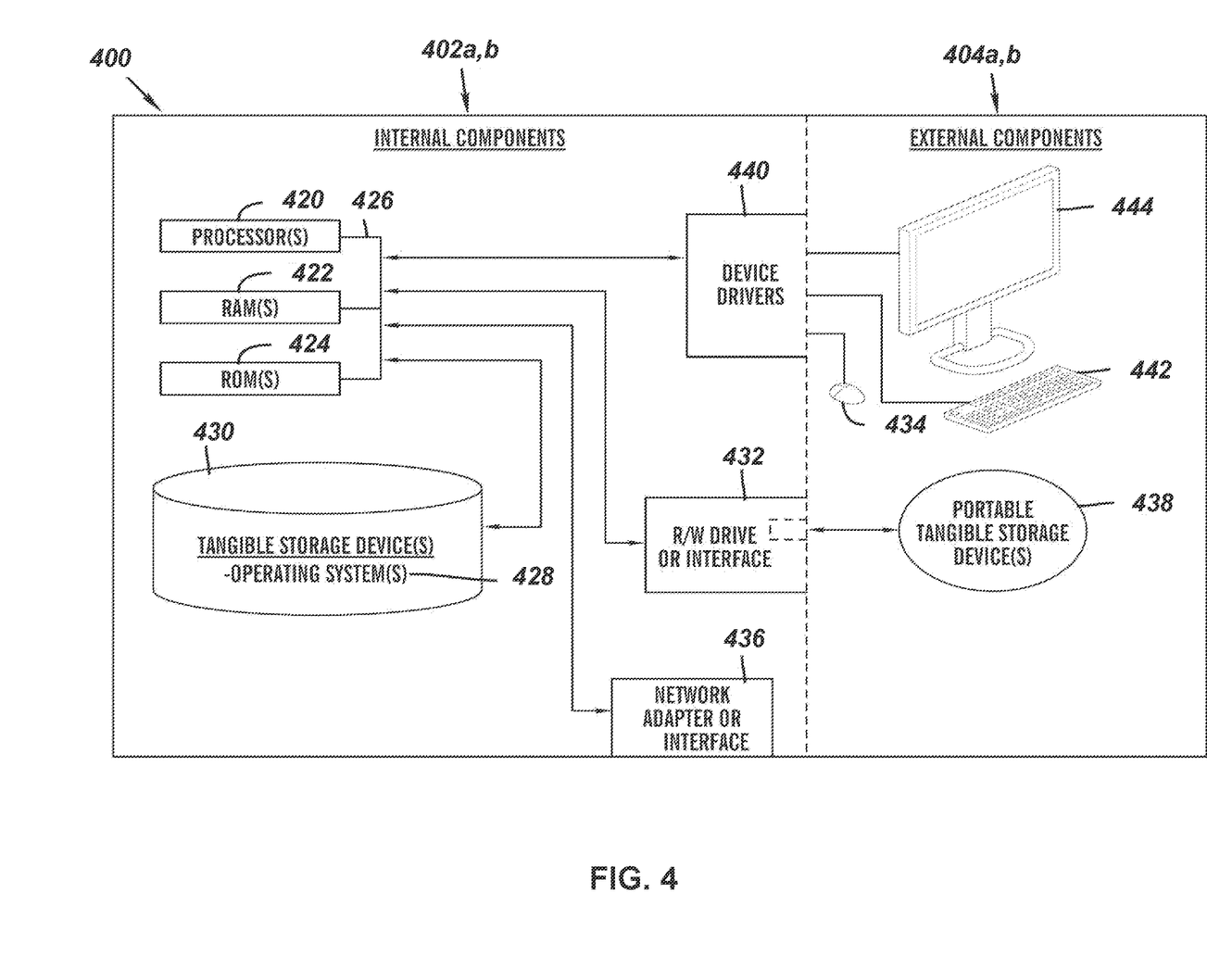
FIG. 4 is a functional block diagram of internal and external components of computers and servers depicted in FIG. 1 according to at least one embodiment.

FIG. 4 is a block diagram 400 of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402a,b and external components 404a,b illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the P2P program 110A in the client computing device 102 and the P2P program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402a,b also includes a R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the P2P program 110A, 110B, can be stored on one or more of the respective portable computer-readable tangible storage devices 438, read via the respective R/W drive or interface 432, and loaded into the respective hard drive 430.

Each set of internal components 402a,b also includes network adapters or interfaces 436 such as a TCP/IP adapter cards, wireless Wi-Fi interface cards, or 3G or 4G wireless interface cards or other wired or wireless communication links. The software program 108 and the P2P program 110A in the client computing device 102 and the P2P program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the P2P program 110A in the client computing device 102 and the P2P program 110B in the server 112 are loaded into the respective hard drive 430. The network may comprise copper wires, optical fibers, wireless transmission, routers, firewalls, switches, gateway computers and/or edge servers.

Each of the sets of external components 404a,b can include a computer display monitor 444, a keyboard 442, and a computer mouse 434. External components 404a,b can also include touch screens, virtual keyboards, touch pads, pointing devices, and other human interface devices. Each of the sets of internal components 402a,b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
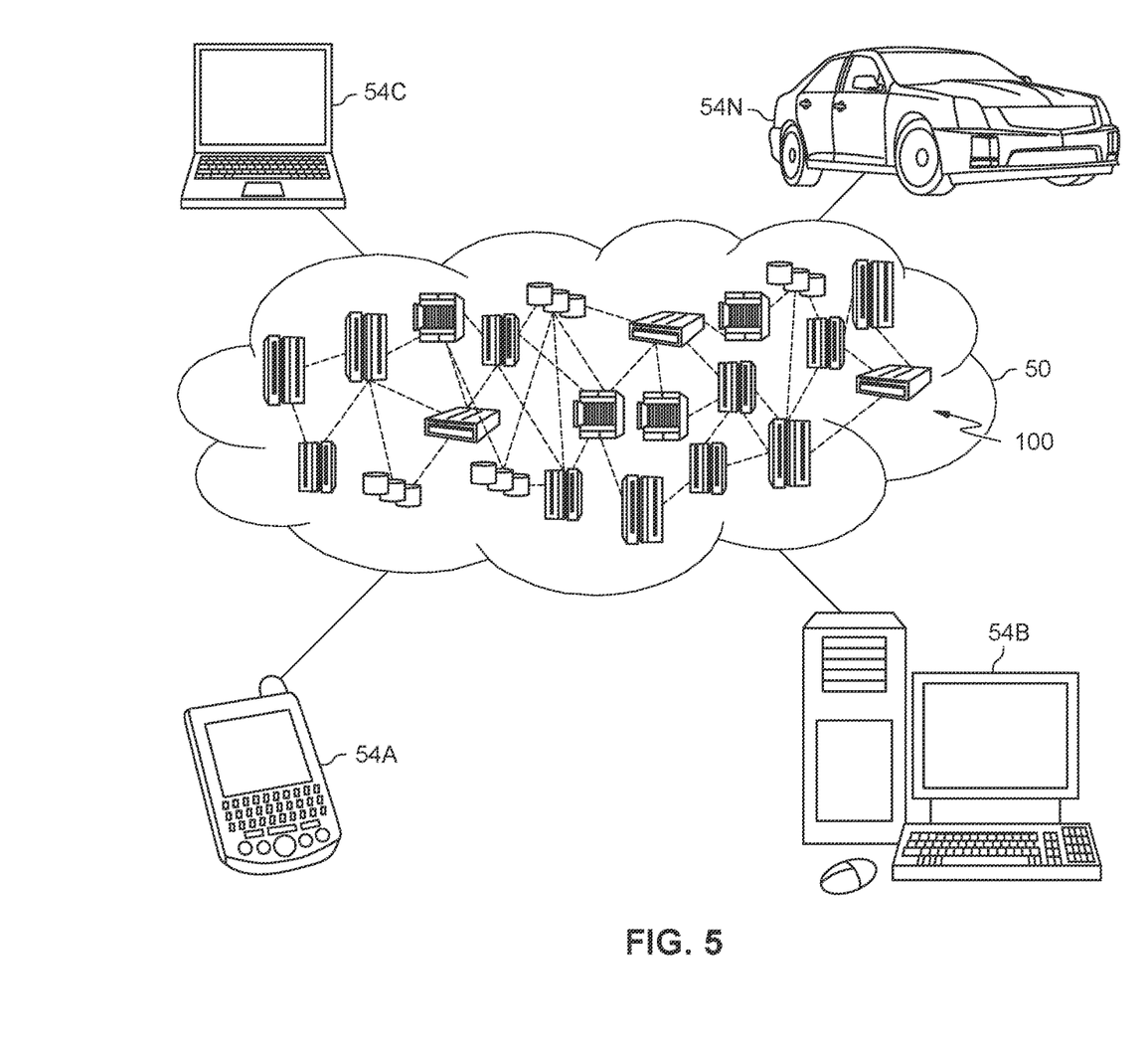
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
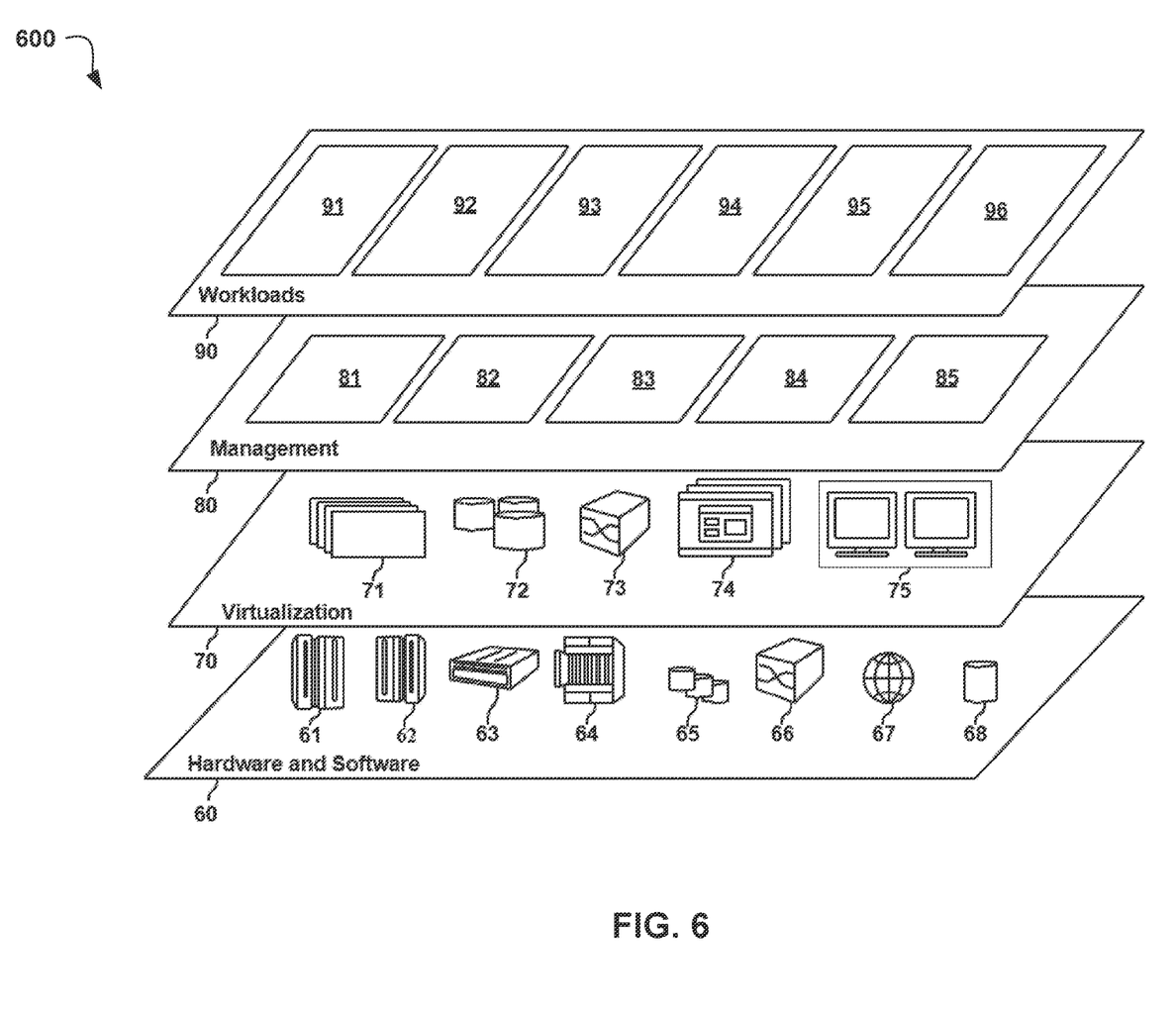
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and managing P2P donations in an online transaction 96. Managing P2P donations in an online transaction 96 may relate to generating a unique redemption authentication token for a donee in response to executing a selected authentication technique in order to verify an identity of the donee upon receiving a request from the donee to redeem transferred funds.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of managing peer-to-peer (P2P) donations in an online transaction, the method comprising:
   receiving data relating to a donation agreement from a donor;
   selecting one or more authentication techniques to identify a donee based on the data relating to the donation agreement, wherein the selected authentication technique includes at least an eye movement pattern of the donee and a voice of the donee;
   generating a unique redemption authentication token for the donee in response to executing the one or more selected authentication techniques, wherein the unique redemption authentication token includes an electronic ID for the eye movement pattern and the voice of the donee;
   creating a transient donee account, wherein the created transient donee account includes the generated unique redemption authentication token, wherein creating the transient donee account further comprises adding the unique redemption authentication token to a table associated with the transient donee account;
   transferring monetary funds to the created transient donee account, wherein transferring the monetary funds further comprises causing a device of the donor to generate audio instructions played for the donee; and
   receiving a request from the donee to redeem the transferred monetary funds utilizing the generated unique redemption authentication token based on the instructions.

2. The computer-based method of claim 1, further comprising:
   determining whether the donee is able to be verified based on the generated unique redemption authentication token; and
   in response to determining the donee is able to be verified, approving the received redemption request.

3. The computer-based method of claim 2, wherein in response to determining the donee is not able to be verified, denying the received redemption request.

4. The computer-based method of claim 2, wherein the created transient donee account is deleted after approving the received redemption request.

5. The computer-based method of claim 1, wherein when the received redemption request from the donee is made after a pre-defined redemption deadline, the transferred monetary funds revert back to the donor.

6. The computer-based method of claim 1, wherein the audio instructions include where and when the transferred monetary funds are to be redeemed.

7. The computer-based method of claim 1, wherein the selected authentication technique is further selected from a group consisting of a fingerprint of the donee, and a passcode given to the donee.

8. A computer system, the computer system comprising:
   one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:
   receiving data relating to a donation agreement from a donor;
   selecting one or more authentication techniques to identify a donee based on the data relating to the donation agreement, wherein the selected authentication technique includes at least an eye movement pattern of the donee and a voice of the donee;
   generating a unique redemption authentication token for the donee in response to executing the one or more selected authentication techniques, wherein the unique redemption authentication token includes an electronic ID for the eye movement pattern and the voice of the donee;
   creating a transient donee account, wherein the created transient donee account includes the generated unique redemption authentication token, wherein creating the transient donee account further comprises adding the unique redemption authentication token to a table associated with the transient donee account;
   transferring monetary funds to the created transient donee account, wherein transferring the monetary funds further comprises causing a device of the donor to generate audio instructions played for the donee; and
   receiving a request from the donee to redeem the transferred monetary funds utilizing the generated unique redemption authentication token based on the instructions.

9. The computer system of claim 8, further comprising:
   determining whether the donee is able to be verified based on the generated unique redemption authentication token; and
   in response to determining the donee is able to be verified, approving the received redemption request.

10. The computer system of claim 9, wherein in response to determining the donee is not able to be verified, denying the received redemption request.

11. The computer system of claim 9, wherein the created transient donee account is deleted after approving the received redemption request.

12. The computer system of claim 8, wherein when the received redemption request from the donee is made after a pre-defined redemption deadline, the transferred monetary funds revert back to the donor.

13. The computer system of claim 8, wherein the audio instructions include where and when the transferred monetary funds are to be redeemed.

14. The computer system of claim 8, wherein the selected authentication technique is further selected from a group consisting of a fingerprint of the donee, and a passcode given to the donee.

15. A computer program product, the computer program product comprising:
   one or more computer-readable tangible storage medium and program instructions stored on at least one of the one or more computer-readable tangible storage medium, the program instructions executable by a processor capable of performing a method, the method comprising:

receiving data relating to a donation agreement from a donor;

selecting one or more authentication techniques to identify a donee based on the data relating to the donation agreement, wherein the selected authentication technique includes at least an eye movement pattern of the donee and a voice of the donee;

generating a unique redemption authentication token for the donee in response to executing the one or more selected authentication techniques, wherein the unique redemption authentication token includes an electronic ID for the eye movement pattern and the voice of the donee;

creating a transient donee account, wherein the created transient donee account includes the generated unique redemption authentication token, wherein creating the transient donee account further comprises adding the unique redemption authentication token to a table associated with the transient donee account;

transferring monetary funds to the created transient donee account, wherein transferring the monetary funds further comprises causing a device of the donor to generate audio instructions played for the donee; and receiving a request from the donee to redeem the transferred monetary funds utilizing the generated unique redemption authentication token based on the instructions.

16. The computer program product of claim 15, further comprising:

determining whether the donee is able to be verified based on the generated unique redemption authentication token; and in response to determining the donee is able to be verified, approving the received redemption request.

17. The computer program product of claim 16, wherein in response to determining the donee is not able to be verified, denying the received redemption request.

18. The computer program product of claim 16, wherein the created transient donee account is deleted after approving the received redemption request.

19. The computer program product of claim 15, wherein when the received redemption request from the donee is made after a pre-defined redemption deadline, the transferred monetary funds revert back to the donor.

20. The computer program product of claim 15, wherein the audio instructions include where and when the transferred monetary funds are to be redeemed.

* * * * *